United States Patent [19]

Moen

[11] 4,157,149

[45] Jun. 5, 1979

[54] MULTIPLE NOZZLE FLUID DISPENSER FOR COMPLEX FLUID DELIVERY PATTERNS

[76] Inventor: Lenard E. Moen, 7914 Michigan, Whittier, Calif. 90602

[21] Appl. No.: 846,899

[22] Filed: Oct. 31, 1977

[51] Int. Cl.[2] .......................... B67D 3/00; F16K 31/00

[52] U.S. Cl. .................................... 222/486; 222/330; 118/411; 68/205 R

[58] Field of Search ............... 222/330, 331, 481, 482, 222/484, 485, 486; 118/313, 411, 412; 68/200, 203, 205 R; 8/149

[56] References Cited

U.S. PATENT DOCUMENTS

| | | | |
|---|---|---|---|
| 2,645,383 | 7/1953 | Miller | 222/330 X |
| 2,804,764 | 9/1957 | Runton | 68/205 R X |
| 3,286,689 | 11/1966 | Ziemba | 118/411 |
| 3,991,917 | 11/1976 | Meon | 222/486 |

*Primary Examiner*—Joseph J. Rolla
*Attorney, Agent, or Firm*—Frederick E. Mueller

[57] ABSTRACT

A multiple nozzle fluid dispenser, such as a glue gun, having some of its nozzle valves selectively and jointly actuable by a common operating element and at least one of its nozzle valves actuable independently of the jointly actuable valves, for controlling fluid flow through the dispenser nozzles in complex delivery patterns.

13 Claims, 4 Drawing Figures

MULTIPLE NOZZLE FLUID DISPENSER FOR COMPLEX FLUID DELIVERY PATTERNS

RELATED APPLICATIONS

Reference is made herein to my copending application Ser. No. 846,900, filed concurrently herewith on Oct. 31, 1977 and entitled MAKING OF CONTAINERS WITH TRI-LAMINATED END WALLS.

BACKGROUND OF THE INVENTION

1. Field of the Invention

This invention relates generally to fluid handling apparatus. More particularly, the invention relates to a multiple nozzle fluid dispenser, such as a glue gun, and a multiple nozzle valve assembly for the dispenser.

Prior Art

As will become readily evident from the ensuing description, the features of this invention may be embodied in a variety of fluid handling devices which require control of fluid flow in a number of separate fluid passages. The primary application of the invention, however, is in a multiple nozzle fluid dispenser for dispensing fluids in preselected complex fluid delivery patterns. For this reason, the invention will be described in this particular context. More specifically, the invention will be described in connection with a multiple nozzle glue dispenser, or glue gun as it is commonly called, for applying a complex pattern of glue stripes or beads to a workpiece. This workpiece may be a preformed cardboard container body blank which may be folded or erected to a container configuration.

The prior art is replete with a vast assortment of multiple nozzle glue dispensers or glue guns. Examples of such glue dispensers are found in U.S. Pat. Nos. 3,420,208; 3,126,574; 3,286,689; 3,190,259; 3,348,520; 3,509,849; and 3,088,433. Another example of a multiple nozzle glue dispenser or glue gun is found in my prior U.S. Pat. No. 3,991,917.

SUMMARY OF THE INVENTION

According to one of its aspects, this invention provides an improved multiple nozzle fluid dispenser which is particularly useful as a multiple nozzle glue gun. A unique feature of this dispenser resides in its adjustable fluid dispensing or delivery pattern which may be preset to any one of an unlimited number of complex delivery patterns.

Another aspect of the invention is concerned with a novel multiple nozzle valve assembly for the fluid dispenser. This valve assembly has a plurality of valves which are actuable jointly by common operating means for controlling fluid flow through corresponding nozzles of the assembly and are independently adjustable to selectively preclude, inhibit, or regulate their opening movement by the common valve operating means. The valve assembly includes at least one additional valve actuable independently of the jointly actuable valves for controlling fluid flow through a corresponding nozzle or nozzles of the valve assembly. The jointly actuable and independently actuable valves are interchangeable such that the valve assembly may embody any number of each of these valve types and any arrangement of the valves.

The jointly actuable valve structure of this dispenser or glue gun is essentially identical to that described in my prior U.S. Pat. No. 3,991,917. In this patented glue gun, the individual, jointly actuable valves have flexible valve stems which are deflected laterally by the common valve operating means to open and close the valves in common.

The adjustability of the individual, jointly actuable valves of the fluid dispenser to selectively prevent, inhibit, or regulate their opening and closing movement by the common valve operating means, the independent actuability of the independently actuable valves, and the interchangeability of the latter valves and the jointly actuable valves, cooperate to provide a fluid dispenser capable of dispensing fluid in a wide variety of dispensing patterns. The glue dispenser of the invention, for example, is ideally suited for use in the container forming machine of my earlier mentioned copending application, Ser. No. 846,900.

DESCRIPTION OF THE PREFERRED EMBODIMENT

Figure 1:
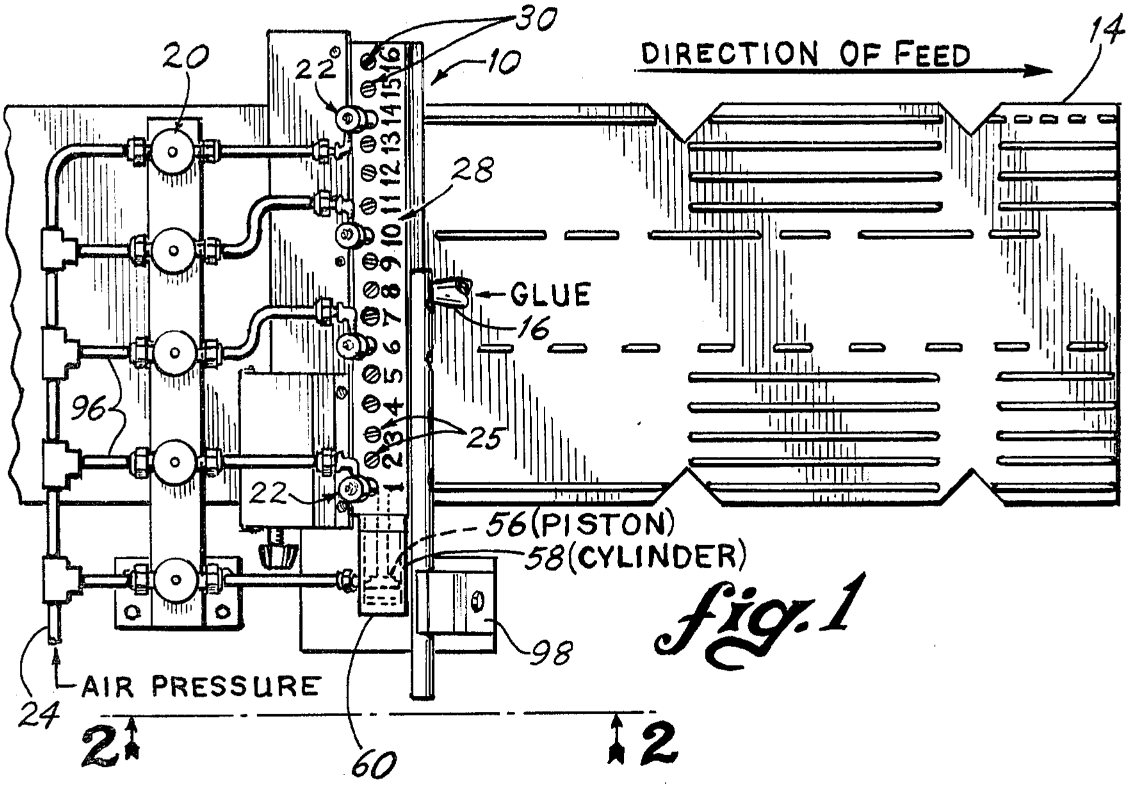
FIG. 1 is a top plan view of a glue dispenser according to the invention for applying glue stripes or beads to a workpiece.
Figure 2:
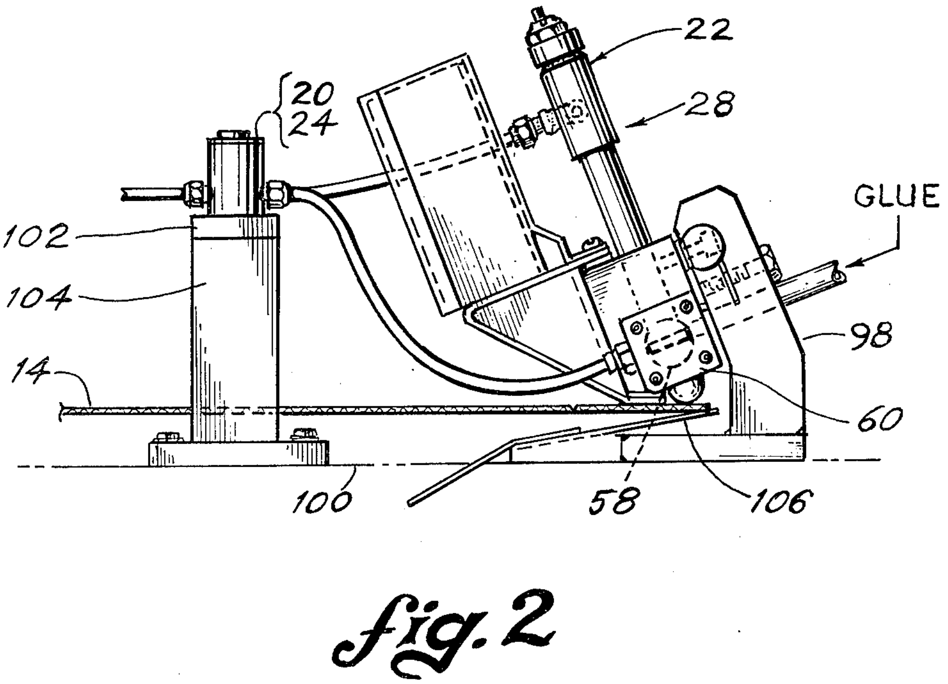
FIG. 2 is an enlarged elevational view of the glue dispenser taken on line 2—2 in FIG. 1.

Referring first to FIGS. 1 and 2, there is illustrated a multiple nozzle fluid dispenser 10 according to the invention. In this instance, the dispenser is a multiple nozzle glue dispenser or glue gun for applying glue stripes or beads 12 to a work sheet 14. This work sheet might be a preformed container body blank to be erected into a container configuration. Glue, such as hot melt glue under pressure, is supplied to all of the nozzles of the glue gun through a glue line 16. A pressurized working fluid, such as air, is supplied through an air line 18 to independently operable solenoid control valves 20 for independently controlling glue valves 22 and to an independently operable solenoid control valve 24 for jointly actuating glue valves 25.

Figure 3:
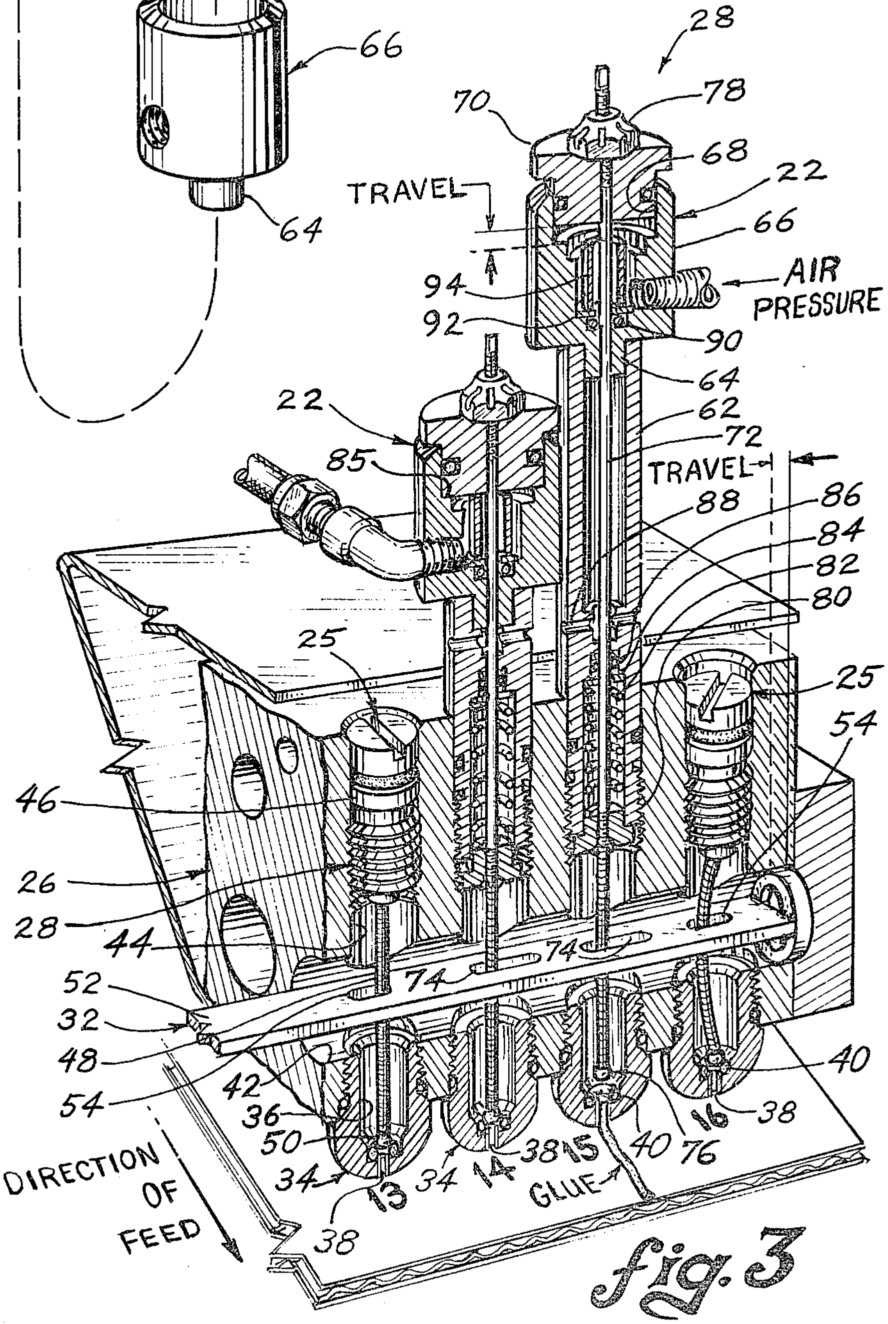
FIG. 3 is an enlarged fragmentary perspective section through the glue dispenser.

The basic glue gun structure is identical in all essential respects to that described in my prior U.S. Pat. No. 3,991,917 and, accordingly, need not be described in elaborate detail. This basic glue gun structure comprises an elongate bar-like body 26 (FIG. 3). This body functions, in part, as a common valve body for a multiple valve assembly 28, comprising the jointly actuable valves 25, and the independently operable individual valves 22.

The jointly actuable valves 25 are operable between open and closed states by common valve operating means 32 for controlling glue flow from the glue line 16 to corresponding glue dispensing nozzles 34 spaced along the lower side of the body 26. Each dispenser nozzle 34 has a generally cup-like shape and is threaded in the underside of the body 26. Extending axially through each nozzle is a passage 36, reduced at one end to form a dispensing orifice 38 opening through the outer or lower end of the nozzle. Surrounding the inner end of this orifice is an O-ring 40 forming a valve seat about the orifice. Nozzle passages 36 open to a bore 42 extending longitudinally through the body 26, and providing a manifold communicating the glue line 16 to the nozzle passages. Entering the upper side of the body 26 on the axis of each nozzle 34 is a threaded bore 44. Each bore 44 opens to the longitudinal body bore or glue manifold 42, diametrically opposite the corresponding dispenser nozzle 34.

Each jointly actuable valve 25 is contained within and comprises a stem holder 46 threaded in one of the body bores 44. Secured at its upper end to each stem holder 46 by a ball and socket connection (not shown) is a laterally flexible valve stem 48. The lower end of each valve stem has a valve element or ball 50 engagable with the corresponding nozzle valve seat 40. The several valve stems 48 traverse the body bore or manifold 42.

The common valve operating means 32 comprises a valve operator or operator bar 52 extending axially through the body bore 42. Spaced along this bar are slots 54 through which extend the valve stems 48. The outboard end of the operator bar in FIG. 3 is releasably secured to a piston 56 (FIG. 1) movable in a cylinder 58 within a cylinder block 60. Cylinder block 60 is removably secured in any convenient way to the end of the dispenser body 26. The cylinder block 60, piston 56, cylinder 58, and operator bar 52 are removable from the dispenser body 26.

Control valve 24 connects the air line 18 to the operator bar cylinder 58. Operation of the valve 24 to one position pressurizes the cylinder 58 to move the valve operator bar 52 to the left in FIG. 3. Operation of the solenoid valve 24 to the other position vents the cylinder 58. The valve operator bar 52 is then retracted to the right to its position of FIG. 3 by a spring (not shown).

The operator bar slots 54 are longitudinally dimensioned to release the flexible valve stems 48 for engagement of their valve elements 50 with the corresponding valve seats 58 to close the glue valves 25 when the operator bar 52 occupies its normal retracted position of FIG. 3. When extended to the left in FIG. 3 by air pressure upon opening of control valve 24, the valve operator bar 52 deflects the valve stems 48 laterally to open the glue valves 25, as more fully explained in my U.S. Pat. No. 3,991,917. As also explained in this patent, the valve stem holders 46 are adjustable axially in their respective body bores 44 to selectively prevent, inhibit or regulate opening and closing movement of each valve 25 by the operator bar.

In the fluid dispenser or glue gun of my U.S. Pat. No. 3,991,917, all of the dispensing glue valves of the gun are flexible stem valves which are operable jointly in the manner described above. In contrast, the valve assembly 28 of the improved fluid dispenser or glue gun of this invention includes the independently actuable valves 22 in addition to the jointly actuable valves 25. Independently actuable valves 22 are threaded in selected bores 44 of the dispenser body 26 and serve to control glue flow from the glue line 16 to the corresponding dispenser nozzles 34.

As explained below, the independently actuable and jointly actuable valves 22, 25 are interchangeable. That is to say, any jointly actuable valve 25 may be replaced by an independently actuable valve 22. Conversely, any independently actuable valve 22 may be replaced by a jointly actuable valve 25. As explained below, the common valve operating bar 52 must be conditioned to accomodate this interchange of the independently and jointly actuable valves.

This interchangeability of the valves 22, 25, the adjustability of the valve stem holders 46 to selectively prevent, inhibit and regulate the opening and closing movements of valves 25 by the common valve operator bar 52, and the independent actuability of the independently actuable valves 22 cooperate to provide a fluid dispenser or glue gun capable of adjustment to provide a wide variety of complex glue dispensing or delivery patterns. One such pattern is illustrated in FIG. 1. My earlier mentioned copending application Ser. No. 846,900 illustrates another possible glue pattern.

Figure 4:
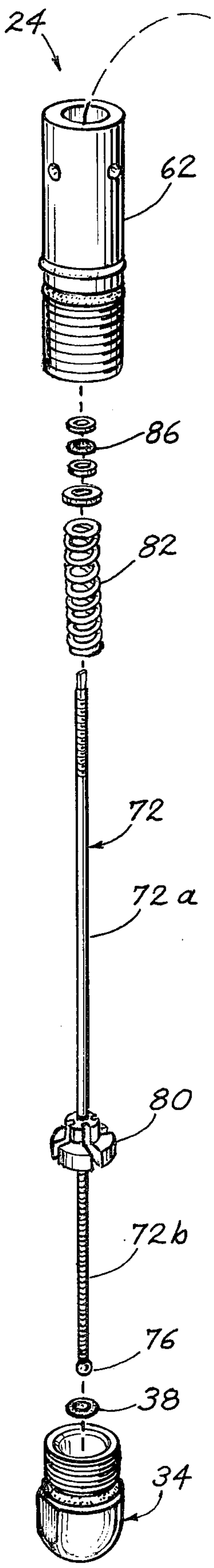
FIG. 4 is a further enlarged exploded perspective view of one independently operable valve of the glue dispenser.
Figure 4:
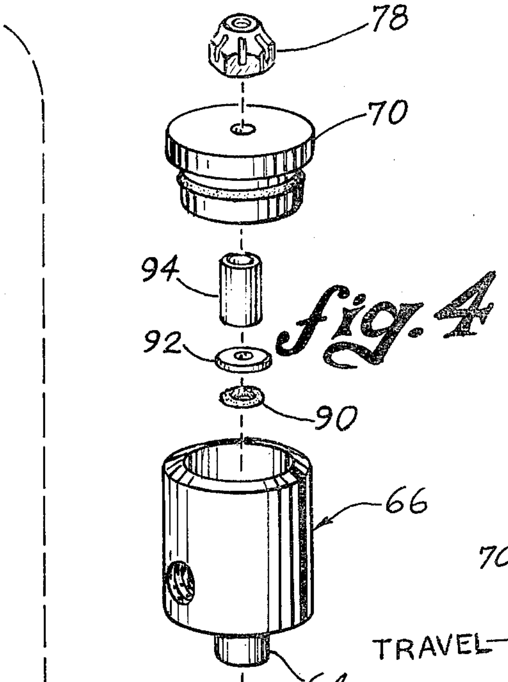

Referring particularly to FIGS. 3 and 4, each independently actuable glue valve 22 comprises a tubular barrel 62 threaded at its lower end in a dispenser body bore 44. Snugly fitted in the upper end of the barrel 62 is a coaxial boss 64 on the lower end of a cylinder 66. A stepped bore 68 extends coaxially into the upper end of this cylinder.

Slidable in the upper, large diameter end of the cylinder bore 68 is a piston 70. A valve rod 72 extends centrally through the piston 70, the cylinder 66, and the barrel 62. The lower end of this valve rod is threaded and extends below the lower end of the barrel 62, through a slot 74 in the valve operator bar 52, and into the corresponding dispenser nozzle 34. On the lower end of the valve rod is a valve element or ball 76 for engagement with the corresponding nozzle valve seat. The valve rod 72 may be relatively rigid throughout its length. The particular valve rod shown has an upper rigid portion **72*a* and a lower flexible portion 72*b* of the same flexible material as the valve stems 48**.

On the upper end of the valve rod 72 is threaded a nut 78 forming a thrust shoulder engaging the top of the piston 70. Threaded on the lower end of the rod is a fluted nut 80 forming a spring seat on the rod. A spring 82 acting between the spring seat 80 and a washer on a shoulder 84 in the valve barrel 62 urges the valve rod 72 downwardly to the closed position of the left hand valve 22 in FIG. 3. In this closed position, the valve piston 70 seats downwardly against a shoulder 85 in its cylinder bore 68 which limits downward travel of the piston. The valve element 76 engages its valve seat 40 to close the corresponding nozzle 34.

Each valve 22 has two adjustments to assure proper seating contact of its valve element 76 with its valve seat 40 when the valve piston 70 occupies its lower limiting position of contact with its cylinder bore shoulder 85. One of these adjustments involves axial adjustment of the upper nut 78 along the valve rod 72 to adjust the valve element 76 axially relative to the valve piston 70 and hence relative to the valve seat 40. The other adjustment involves axial adjustment of the valve barrel 62 in its threaded bore 44 of the body 26.

Just above the barrel shoulder 84 is a seal ring 86, coaxially sandwiched between a pair of back up rings, for sealing the valve rod 72 to the barrel 62. Leakage of glue through flutes of nut 80 and past this seal ring is indicated by passage of glue through glue escape holes 88 just above the seal ring. These holes may double as wrench holes for threading the valve barrel 62 into and from the dispenser body 26 both to assemble the dispenser and adjust the valve element 76 relative to its valve seat 40, as just described.

The upper end of the valve rod 72 slides in the lower end of the valve cylinder bore 68. A seal ring 90 seals the rod to the cylinder 66. Above the seal ring 90 is a washer 92 which seats downwardly on a shoulder in the cylinder. A sleeve 94 surrounds the valve rod 72 above the washer 92. The cylinder bore 68 of each independently actuable valve 22 is connected to the air line 18 through an air hose 96 and a solenoid control valve 20.

As shown in FIG. 3, the valve barrels 62 may be made in different lengths to permit two valves 22 to be located in close side by side relation without interference. If the sizing and/or the spacing of these valves is such to preclude interference of adjacent valves, of course, all of the valves 22 may have the same length.

Operation to one position of the control valve 20 for an independently actuable valve 22 pressurizes the valve cylinder bore 68 below its piston 70. The piston, and thereby its valve rod 72 and valve element 76, are then driven upwardly to the upper open position of the right hand valve 22 in FIG. 3. Return of the control valve 20 to its original position vents the independently operable valve cylinder bore 68 to permit spring return of its valve rod 72 and valve element 76 to closed position and causes the piston to press downwardly on the valve sleeve 94 to thereby press the valve rod seal ring 90 back into its seat. The slots or grooves in the lower spring seat nut 80 of the valve permit free passage of glue past the nut during this opening and closing movement of the valve rod 72 to prevent the glue in the valve barrel 62 above the nut from inhibiting opening of the valve.

The valve rod clearance slots 74 in the common valve operating bar 52 are sized to clear the valve rods 72 throughout the full stroke of the bar. Thus, the valve operator bar 52 exerts lateral deflection forces on the laterally deflectable valve stems 48 only to effect joint opening and closing movement of only the jointly actuable valves 25.

As noted earlier, the independently actuable valves 22 and jointly actuable valves 25 are interchangeable. Thus, either a valve 22 or a valve 25 may be threaded in each body bore 44. Accordingly, the numbers of independently and jointly actuable valves 22, 25 and the arrangement of these valves in the fluid dispenser 10 may be varied. A valve operator bar with the proper arrangement of the slots 54, 74, will be provided for each of these possible valve arrangements. When the arrangement of the independently and jointly actuable valves 22, 25 is changed, the existing valve operator bar 52 is removed and replaced by the correct operator bar by removing the cylinder block 60, piston 56, cylinder 58, and bar 52 in the manner discussed earlier. Alternatively, all of the operator bar slots may be made like the large slots 74 and slot reducing inserts may be provided for removable placement in the bar slots in accordance with the arrangement of the jointly actuable valve stems 48.

Referring to FIGS. 1 and 2, the fluid dispenser 10 is secured to an upright post 98 fixed to a supporting frame 100, or the like, in essentially the same manner as in my prior U.S. Pat. No. 3,991,917. The dispenser overlies the path of movement of the work piece 14 past the gun. The solenoid control valves 20, 24 are mounted on a supporting bar 102 which also overlies the path of the workpiece 14 and is secured to an upright post 104 on the frame 100.

The workpiece 14 moves past the underside of the dispenser 10 between the latter and spring fingers 106. The spring fingers urge the workpiece upwardly against the lower ends of the dispenser nozzles 34, as shown best in FIG. 2. As also shown in the latter Figure, the nozzle axes of the glue gun are inclined relative to the plane of the workpiece in a direction opposite to the direction of movement of the workpiece.

The operation of the fluid dispenser or glue gun 10 is believed to be obvious in the preceding description. During this operation, the solenoid control valves 20, 24 may be selectively operated in any desired timing relative to one another, as by a preprogrammed control circuit, to open and close the corresponding independently and jointly actuable valves 22, 25 of the dispenser. In the particular application shown, opening of each valve effects dispensing of a stripe or bead 12 of glue through the corresponding dispenser nozzle 34 onto the workpiece 14.

It is readily apparent that the independent operability of the independently operable valves 24, the adjustability of the jointly actuable valves 25 to selectively inhibit or regulate their opening and closing movement by the joint valve operating bar 52, the capability of varying the numbers and arrangements of the valves 22, 25, and the ability of controlling the solenoid valves 20, 24 in any desired fashion permits operation of the glue gun 10 to produce a wide variety of glue stripe or glue bead patterns on the workpiece 14.

The pattern of distribution of glue beads 12 on the body blank 14 of FIG. 1 is a hypothetical case to demonstrate the versatility of the invention. At positions 1, 6, 10, and 14 of the gun 10, independently actuable valves 22 have been mounted in the manner previously described. Valves 25 are mounted at positions 7, 8, 9, 15, and 16 of the gun but with their respective adjusting screws or stem holders 46 axially adjusted inwardly so that the valve remains inoperative irrespective of actuation of the actuating bar 52, i.e., the condition of the valve 25 shown at position 16 in FIG. 3. The other valves 25 at positions 2, 3, 4, 5, 11, 12, and 13 are operated in unison by the common operator bar 52. Then, assuming an appropriate program of control of the several solenoid valves 20, 24, the complex pattern of glue stripes 12 illustrated may be achieved, e.g., with each of the independently operable valves 25 at the positions 1, 6, 10, and 14 delivering a stripe pattern different from that of any other of the independently controllable valves during a cycle in which the commonly operable valves 30 are operated at some point or points.

What is claimed as new in support of letters patent is:

1. A multiple valve assembly comprising:

a body including a plurality of valves with a corresponding plurality of valve seats;

at least a first one of said valves including a laterally flexible valve stem having a valve element at one end moveable into and from engagement with a corresponding valve seat by lateral deflection of said valve stem to open and close a corresponding valve;

at least one independently actuable one of said valves including a valve rod having a valve element at one end moveable into and from seating engagement with a corresponding valve seat by axial movement of said valve rod to open and close the corresponding valve;

a valve actuator for each independently actuable valve secured to the opposite end of the corresponding valve rod to move the latter axially;

said body containing a bore traversed by each valve stem and valve rod; and an operating means for said at least one first valve moveable in said body bore for exerting lateral deflecting forces on said flexible valve stems only.

2. The valve assembly of claim 1 wherein:

said valve operating means comprises an operating bar movable longitudinally in said body bore through a given stroke and having clearance openings through which said valve stems and valve rods extend, and said bar openings being sized in length longitudinally of said bar such that the bar exerts lateral deflecting forces on said flexible valve stems only during movement of the bar through said given stroke.

3. The valve assembly of claim 1 wherein said first ones of said valves comprise a plurality of jointly actuable valves.

4. The valve assembly of claim 3 wherein:

each jointly actuable valve includes a valve stem holder located opposite the corresponding valve seat and secured to the opposite end of the corresponding valve stem, each stem holder and valve actuator is releasably secured to and accessible externally of said body in a manner such that any stem holder and its flexible valve stem may be replaced by a valve actuator and valve rod, and any valve actuator and its valve rod may be replaced by a valve stem holder and valve stem, whereby the numbers and arrangement of said jointly and independently actuable valves may be varied, and means whereby any jointly actuable valve may be replaced by an independently actuable valve and any independently actuable valve may be replaced by a jointly operable valve, and means for accomodating said valve operating means to any arrangement of said jointly and independently actuable valves.

5. The valve assembly of claim 3 wherein:

each jointly actuable valve includes a stem holder in said body opposite said valve seat and secured to the opposite end of said valve stem, each valve stem holder and valve actuator is releasably secured to and accessible externally of said body in a manner such that any stem holder and its flexible valve stem may be replaced by a valve actuator and valve rod, and any valve actuator and its valve rod may be replaced by a stem holder and valve stem, whereby the arrangement of said jointly and independently actuable valves may be varied, and said valve operating means comprises means for accommodating said operating means to any arrangement of said valves.

6. The valve assembly of claim 5 wherein:

said stem holders and valve actuators are threaded in bores entering the external surface of said body and have matching threads, whereby any holder or any actuator may be threaded in any latter bore of said body.

7. A multiple nozzle fluid dispenser comprising:

a body including a multiplicity of fluid dispensing nozzles, a fluid inlet communicating with said nozzles, and a plurality of valves with a corresponding plurality of valve seats for controlling fluid flow to said nozzles;

at least a first one of said valves including a laterally flexible valve stem having a valve element at one end moveable into and from engagement with a corresponding valve seat by lateral deflection of said valve stem to open and close corresponding valve;

at least one independently actuable valve including a valve rod having a valve element at one end moveable into and from seating engagement with a corresponding valve seat by axial movement of said valve rod to open and close the corresponding valve;

a valve actuator for each independently actuable valve secured to the opposite end of the corresponding valve rod to move the latter axially;

said body containing a bore traversed by each valve stem and valve rod; and an operating means for said at least one first valve moveable in said body bore for exerting lateral deflecting forces on said flexible valve stems only.

8. The fluid dispenser of claim 7 wherein:

said valve operator comprises an operating bar movable longitudinally in said body bore through a given stroke and having clearance openings through which said valve stems and valve rods extend, and said bar openings being sized in length longitudinally of said bar such that the bar exerts lateral deflecting forces on said flexible valve stems only during movement of the bar through said given stroke.

9. The fluid dispenser of claim 8 wherein:

each jointly operable valve includes a valve stem holder located opposite the corresponding valve seat and secured to the opposite end of the corresponding valve stem, each stem holder and valve actuator is releasably secured to and accessible externally of said body in a manner such that any stem holder and its flexible valve stem may be replaced by a valve actuator and valve rod, and any valve actuator and its valve rod may be replaced by a valve stem holder and valve stem, whereby the numbers and arrangement of said jointly and independently operable valves may be varied, and means whereby any jointly operable valve may be replaced by an independently operable valve and any independently operable valve may be replaced by a jointly operable valve, and means for accomodating said valve operating means to any arrangement of said jointly and independently operable valves.

10. A multiple nozzle fluid dispenser as in claim 7 wherein said at least one of said valves comprises a plurality of jointly actuable valves.

11. The fluid dispenser of claim 10 wherein:

each jointly actuable valve includes a stem holder in said body opposite said valve seat and secured to the opposite end of said valve stem, each independently actuable valve has said valve rod secured to and accessible externally of said body in a manner such that any stem holder and its flexible valve stem may be replaced by a valve actuator and valve rod, and any valve actuator and its valve rod may be replaced by a stem holder and valve stem, whereby the arrangement of said jointly and independently actuable valves may be varied, and said valve operating means comprises means for accommodating said operating means to any arrangement of said valves.

12. The fluid dispenser of claim 11 wherein:

said stem holders and valve actuators are threaded in bores entering the external surface of said body and have matching threads, whereby any holder or any actuator may be threaded in any latter bore of said body.

13. The fluid dispenser of claim 12 wherein:

said nozzles are arranged side by side in a row.

* * * * *

UNITED STATES PATENT OFFICE
CERTIFICATE OF CORRECTION

PATENT NO. : 4,157,149

DATED : June 5, 1979

INVENTOR(S) : LENARD E. MOEN

It is certified that error appears in the above-identified patent and that said Letters Patent are hereby corrected as shown below:

Column 7, line 64, between "close" and "corresponding", insert --the--.

Column 8, line 49, delete "each independently actuable valve has said valve rod" and insert --each valve stem holder and valve actuator is releasably--.

Signed and Sealed this

*Eleventh* Day of *September 1979*

[SEAL]

*Attest:*

LUTRELLE F. PARKER

*Attesting Officer* *Acting Commissioner of Patents and Trademarks*